(12) United States Patent
Schnaibel et al.

(10) Patent No.: US 6,901,745 B2
(45) Date of Patent: Jun. 7, 2005

(54) METHOD FOR OPERATING A NITROGEN OXIDE (NOX) STORAGE CATALYST

(75) Inventors: Eberhard Schnaibel, Hemmingen (DE); Klaus Winkler, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 150 days.

(21) Appl. No.: 10/333,955

(22) PCT Filed: Jul. 11, 2001

(86) PCT No.: PCT/DE01/02595
§ 371 (c)(1),
(2), (4) Date: Jan. 27, 2003

(87) PCT Pub. No.: WO02/08584
PCT Pub. Date: Jan. 31, 2002

(65) Prior Publication Data
US 2003/0167754 A1 Sep. 11, 2003

(30) Foreign Application Priority Data
Jul. 26, 2000 (DE) .......................... 100 36 406

(51) Int. Cl.$^7$ ................................ F01N 3/00
(52) U.S. Cl. ................. 60/285; 60/274; 60/276; 60/277; 60/285; 60/286; 73/23.32
(58) Field of Search ................ 60/274, 276, 277, 60/285, 286; 73/23.31, 23.32, 118.1; 123/406.44; 204/410, 424

(56) References Cited
U.S. PATENT DOCUMENTS 3,969,932 A 7/1976 Rieger et al.
6,216,451 B1 4/2001 Schnaibel et al.
6,309,536 B1 * 10/2001 Inagaki et al. .............. 205/781
6,311,480 B1 * 11/2001 Suzuki et al. ................. 60/276
6,427,437 B1 * 8/2002 Bidner et al. ................. 60/274
6,453,663 B1 * 9/2002 Orzel et al. ................... 60/277
6,460,329 B2 * 10/2002 Shimotani et al. ........... 60/285
6,581,571 B2 * 6/2003 Kubesh et al. ......... 123/406.44
6,588,251 B2 * 7/2003 Zhang et al. .............. 73/23.32

FOREIGN PATENT DOCUMENTS

| EP | 0 560 991 | 9/1993 |
| EP | 0 733 786 | 9/1996 |
| EP | 0 735 250 | 10/1996 |
| EP | 0 867 604 | 9/1998 |

* cited by examiner

Primary Examiner—Tu M. Nguyen
(74) Attorney, Agent, or Firm—Walter Ottesen (57) ABSTRACT

The invention relates to a method for operating a nitrogen oxide (NOx) storage catalytic converter (12'). During a first operating phase of the storage catalytic converter (12'), nitrogen oxides are stored and, during a second operating phase, stored nitrogen oxides are discharged from the converter (12'). The stored quantity of nitrogen oxides is determined during the first operating phase. In order to be able to determine start and end of the second operating phase as accurately as possible, a quantity, which characterizes the discharge quantity of nitrogen oxides, is determined during the second operating phase and compared to the stored quantity of nitrogen oxides determined during the first operating phase. With the comparison, a plausibility check and a calibration of the output signal of a nitrogen oxide (NOx) sensor (14') can take place. The nitrogen oxide (NOx) sensor (14') is disposed downstream of the storage catalytic converter (12').

19 Claims, 3 Drawing Sheets

METHOD FOR OPERATING A NITROGEN OXIDE (NOX) STORAGE CATALYST

This application is the U.S. national stage of International application No. PCT/DE01/02595, filed Jul. 11, 2001, designating the United States.

FIELD OF THE INVENTION

The present invention relates to a method for operating a nitrogen oxide (NOx) storage catalytic converter of an internal combustion engine especially of a motor vehicle. Nitrogen oxides are stored in the storage catalytic converter during a first operating phase thereof which can be characterized as a storing phase. During a second operating phase, which can also be characterized as a discharge phase, stored nitrogen oxides are discharged from the storage catalytic converter. The stored quantity of nitrogen oxides is determined during the first operating phase.

The present invention furthermore relates to a control apparatus for an internal combustion engine, especially of a motor vehicle. The internal combustion engine includes a nitrogen oxide (NOx) storage catalytic converter in which nitrogen oxides can be stored during a first operating phase, the so-called storing phase, and, during a second operating phase, the so-called discharge phase, the stored nitrogen oxides can be discharged. The control apparatus includes first means for determining the quantity of nitrogen oxides stored during the first operating phase.

Furthermore, the present invention relates to a control element, especially a read-only-memory or a flash memory for such a control apparatus.

Finally, the present invention relates to an internal combustion engine, especially of a motor vehicle. The internal combustion engine includes a nitrogen oxide (NOx) storage catalytic converter wherein nitrogen oxides can be stored during a first operating phase, the so-called storing phase, and, during a second operating phase, the so-called discharge phase, stored nitrogen oxides can be discharged. Furthermore, the internal combustion engine includes a control apparatus having first means for determining the quantity of nitrogen oxides stored during the first operating phase.

BACKGROUND OF THE INVENTION

U.S. Pat. 5.473.887 discloses use of a NOx-storage catalytic converter for storing nitrogen oxides which are emitted by an internal combustion engine during a lean operation (lean air/fuel mixture, lambda>1).

U.S. Pat. 3,969.932 discloses applying the output signals of exhaust-gas probes for evaluating a 3-way catalytic converter in the context of an on-board diagnosis. The exhaust-gas probes are oxygen sensitive and are mounted forward and rearward of the catalytic converter. The known method is based on the oxygen storage capability of an operable 3-way catalytic converter. In this context, U.S. Pat. 3.969,932 discloses a change of the air/fuel mixture composition from lambda=0.95 (rich, fuel-rich mixture; oxygen deficiency) to lambda=1.05 (lean, low-fuel mixture, oxygen excess). The exhaust-gas sensor mounted forward of the catalytic converter reacts to a change of the air/fuel mixture composition virtually without delay. The exhaust-gas sensor mounted downstream of the catalytic converter, however, reacts only after a time span which is dependent upon the oxygen storing capability of the catalytic converter. The reason for this fact is that the oxygen storage locations of the catalytic converter are at first not occupied because of the oxygen deficiency present in the exhaust gas which is present at lambda=0.95. After the switchover to lean operation (oxygen excess) forward of the catalytic converter, the oxygen storage locations are successively occupied. For this reason, there continues to be at first an oxygen deficiency rearward of the catalytic converter after the change of the mixture composition. Only when the oxygen storage locations are occupied, an oxygen excess slowly builds up rearward of the catalytic converter which leads to a change of the output signal of the rearward exhaust-gas sensor. The time delay, that is, the phase shift between the reactions of, the two exhaust-gas sensors, can be used to evaluate the oxygen storage capability for the diagnosis of the catalytic converter.

Internal combustion engines having gasoline direct injection afford the advantage of reduced carbon dioxide ($CO_2$) emissions. These internal combustion engines are operated mostly with a lean air/fuel mixture (lambda>1). For this reason, these engines are provided with a nitrogen oxide (NOx) storage catalytic converter which stores the NOx emissions arising during the lean mixture phase. Gasoline-direct injecting internal combustion engines are also operated at lambda=1 (homogeneous operation). For this reason, the NOx storage catalytic converters have, as a rule, also a storage capability for oxygen. For storing oxygen, a conventional 3-way catalytic converter can, for example, be used.

The storage capability of a catalytic converter with respect to nitrogen oxides and oxygen is limited. For this reason, the catalytic converter must be regenerated from time to time. During the discharge phase, a reducing agent is added to the exhaust gas via which the stored nitrogen oxides are reduced to oxygen and nitrogen. The reducing agent is, for example, configured as a hydrocarbon (HC) and carbon monoxide (CO) which can be inputted into the exhaust gas ahead of the catalytic converter via a rich mixture adjustment. Alternatively, urea can be added to the exhaust gas as a reducing agent. Here, for reducing the hydrogen oxide to oxygen and nitrogen, ammonia from the urea is used. The ammonia can be obtained from a urea solution by hydrolysis.

The time points for the start and end of the storage phase are important for the emissions discharged into the ambient rearward of the catalytic converter. During a lean operation of the internal combustion engine, the NOx storage catalytic converter is filled with nitrogen oxide and the 3-way catalytic converter is filled with oxygen. The start of the storage phase is determined via an NOx storing model. The NOx storing model models the nitrogen oxide quantity introduced to the NOx storage catalytic converter and so models the NOx fill level of this catalytic converter. If the modeled variable exceeds a pregivable threshold, then a discharge phase is initiated.

U.S. Pat. 6,216,451 discloses ending the discharge phase when an output signal of an exhaust-gas sensor, which is mounted rearward of the catalytic converter, exceeds a pregivable threshold value. Because of manufacturing tolerances, deterioration and temperature fluctuations, fluctuations of the output signal of the rearward exhaust-gas sensor can, however, occur which can lead to an early or a late ending of the discharge phase. The consequences are inadequate utilization of the maximum storage capability of the catalytic converter because of a discharge phase which ends too early or exhaust-gas emissions which are too high, especially an emission of the reducing agent in a discharge phase which ends too late.

SUMMARY OF THE INVENTION

The present invention therefore has as its basis the task of reliably determining with the best possible accuracy the start and end of the second operating phase (discharge phase).

To solve this task, the invention suggests starting from the method of the kind mentioned initially herein that, during the second operating phase, a quantity is determined which characterizes the discharged quantity of nitrogen oxides and that this quantity is compared to the stored quantity of nitrogen oxides determined during the first operating phase.

The quantity of nitrogen oxides, which are discharged during the second operating phase, corresponds, in the ideal case, to the NOx storage content of the NOx storage catalytic converter determined in the first operating phase. During the first operating phase, the NOx storage content can, for example, be determined via an NOx storage model. The quantity, which is determined during the second operating phase and which characterizes the discharge quantity of nitrogen oxides, is compared to the determined NOx storage content and can, for example, be applied for a plausibility check of the stored quantity of nitrogen oxides, which is determined during the first operating phase, or for the diagnosis of the NOx storage catalytic converter.

According to the method of the invention, the NOx store content of the NOx storage catalytic converter or a quantity, which is in relationship to the NOx store content, is determined in two ways independent of each other. The values determined in different ways for the NOx store content are compared to each other and are applied for increasing the accuracy of the determination of the NOx store content. In this way, the start and the end of the second operating phase can be determined with significantly greater accuracy.

According to an advantageous embodiment of the present invention, it is suggested that the quantity of nitrogen oxides, which is stored during the first operating phase, is determined with the aid of an exhaust-gas sensor and a calibration of the exhaust-gas sensor is carried out with the aid of the quantity determined during the second operating phase. It is suggested that the slope of the characteristic line of the exhaust-gas sensor be varied for the calibration of the exhaust-gas sensor. The exhaust-gas sensor can be configured as a nitrogen oxide (NOx) sensor and/or as an oxygen (O2) sensor. With this calibration of the exhaust-gas sensor, the start as well as the end of the discharge phase can be determined very accurately. In this way, on the one hand, the complete storage capacity of the NOx storage catalytic converter can be utilized and, on the other hand, an especially low emission of toxic substances can be achieved rearward of the catalytic converter.

According to another advantageous embodiment of the present invention, it is suggested that the nitrogen oxides be discharged from the catalytic converter with the aid of a reducing agent and the quantity of reducing agent, which is needed during the second operating phase, is determined as the quantity characterizing the discharge quantity of nitrogen oxides.

According to a preferred embodiment of the present invention, it is suggested that the quantity of reducing agent, which is needed during the second operating phase, is determined via an integration of the reducing agent flow as a function of time. The reducing agent flow is advantageously determined from an air mass flow in an intake manifold of the internal combustion engine and from the oxygen content of the exhaust gas ahead of the storage catalytic converter. The air mass flow can, for example, be determined by means of an air mass sensor or from the position of a throttle flap mounted in the intake manifold. The position of the throttle flap can be determined via a throttle flap potentiometer. The oxygen content of the exhaust gas forward of the catalytic converter can, for example, be determined by means of a conventional lambda probe or even from a modeled lambda desired value.

It is further suggested that the integration be started with a drop of the oxygen content of the exhaust gas ahead of the storage catalytic converter from a lean air/fuel mixture to a rich air/fuel mixture. The drop of the oxygen content of the exhaust gas can, for example, be detected by means of a lambda probe mounted in the exhaust-gas pipe ahead of the storage catalytic converter or can be determined from a modeled lambda desired value. A drop of the oxygen content of the exhaust gas is an indication that the internal combustion engine has been switched over from a lean operation to an operation with a rich air/fuel mixture, that is, that the second operating phase (discharge phase or regeneration phase) has been initiated.

Advantageously, the integration is ended via a drop of the oxygen content of the exhaust gas downstream of the storage catalytic converter from a lean to a rich air/fuel mixture. The drop of the oxygen content of the exhaust gas can, for example, be detected by means of an oxygen-sensitive NOx sensor, which is mounted in the exhaust-gas pipe downstream of the storage catalytic converter, or is detected by a separate O2 sensor. A drop of the oxygen content of the exhaust gas downstream of the storage catalytic converter is an indication that the second operating phase is ended; that is, that all of the nitrogen oxide from the NOx storage catalytic converter has been regenerated.

The quantity of reducing agent, which is needed during the second operating phase for the reduction of the NOx storage catalytic converter, corresponds, in the ideal case, precisely to the NOx store content of the previous storing phase and therefore to the value of the mass of nitrogen oxides in the NOx store at the end of the last storing phase. The NOx store content of the storage catalytic converter is determined by means of the NOx storing model and is controlled by the NOx sensor. This NOx store content is now compared to the value of the needed quantity of reducing agent and is subjected to a plausibility check. A deviation of the NOx store content from the quantity of reducing agent determined independently thereof can be applied to calibrate the output signal of the NOx sensor, that is, to adapt the slope of the output signal.

Of special significance is the realization of the method of the invention in the form of a control element which is provided for a control apparatus of an internal combustion engine. especially of a motor vehicle. A program is stored on the control element which can be run on a computing apparatus, especially on a microprocessor, and is suitable for carrying out the method of the invention. In this case, the invention is therefore realized by a program stored on the control element so that this control element provided with the program defines the invention in the same manner as the method which the program is suitable to carry out. As a control element, especially an electric storage medium can be applied, for example, a read-only-memory or a flash memory.

A further solution of the task of the present invention is suggested starting from the control apparatus of the kind mentioned initially herein in that the control apparatus includes second means for determining a quantity, which characterizes the quantity of nitrogen oxides discharged during the second operating phase, and third means for comparing the stored quantity of nitrogen oxides, which is determined during the first operating phase, to the determined quantity.

Finally, to solve the task of the present invention and starting from the internal combustion engine of the kind mentioned initially herein, it is suggested that the internal combustion engine includes second means for determining a quantity characterizing the quantity of nitrogen oxides discharged during the second operating phase, and third means for comparing the stored quantity of nitrogen oxides, which was determined during the first operating phase, to the determined quantity.

According to an advantageous further embodiment of the present invention, it is suggested that the first means include a nitrogen oxide (NOx) sensor which is mounted downstream of the storage catalytic converter. The internal combustion engine includes means for calibrating the NOx sensor with the aid of the determined quantity.

According to a preferred embodiment of the present invention, it is suggested that the second means include an integrator for determining a quantity of reducing agent, which is needed during the second operating phase, by integrating a reducing agent flow as a function of time.

Advantageously, the internal combustion engine includes an air mass sensor or means for detecting the position of a throttle flap, which is mounted in the intake manifold, for determining an air mass flow and an oxygen (O2) sensor, which is mounted forward of the storage catalytic converter, for detecting the oxygen content of the exhaust gas. The reducing agent flow is determined from the air mass flow and the oxygen content of the exhaust gas. The oxygen sensor is, for example, configured as a conventional lambda probe.

A drop of the oxygen content of the exhaust gas forward of the storage catalytic converter from a lean to a rich air/fuel mixture advantageously initiates the integration. A drop of the oxygen content of the exhaust gas after the storage catalytic converter from a lean to a rich air/fuel mixture advantageously ends the integration.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
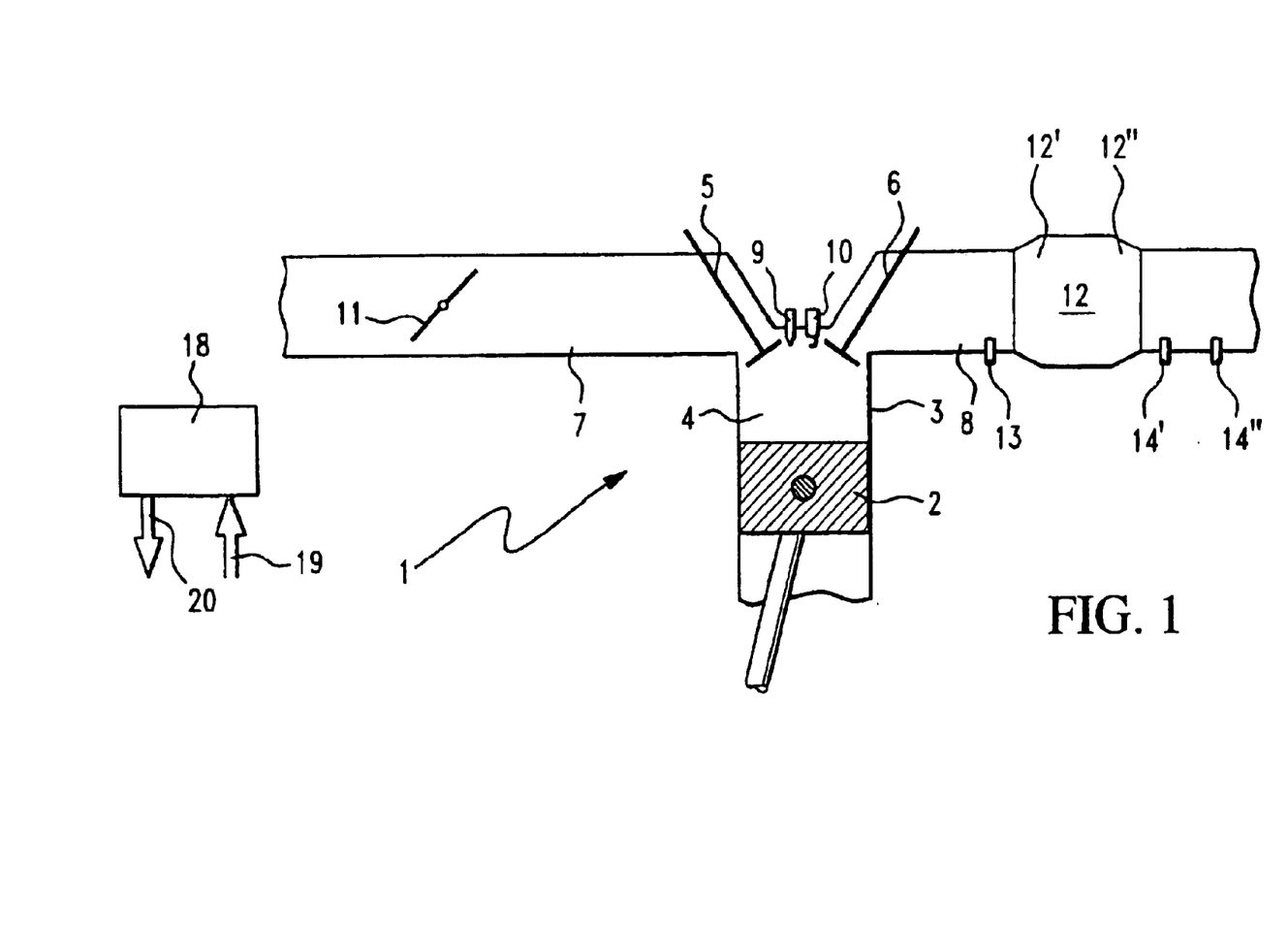
FIG. 1 is a schematic block diagram of an internal combustion engine of the invention in accordance with a preferred embodiment.

In FIG. 1, a direct-injecting internal combustion engine 1 of a motor vehicle is shown, wherein a piston 2 is movable back and forth in a cylinder 3. The cylinder 3 is provided with a combustion chamber 4 which, inter alia, is delimited by the piston 2, an inlet valve 5 and an outlet valve 6. An intake manifold 7 is coupled to the inlet valve 5 and an exhaust-gas pipe 8 is coupled to the outlet valve 6.

A fuel-injection valve 9 and a spark plug 10 project into the combustion chamber 4 in the region of the inlet valve 5 and of the outlet valve 6. Fuel can be injected into the combustion chamber 4 via the injection valve 9. The fuel in the combustion chamber 4 can be ignited by the spark plug 10.

A rotatable throttle flap 11 is mounted in the intake manifold 7. Air is supplied via the throttle flap 11 to the intake manifold 7. The quantity of the supplied air is dependent upon the angular position of the throttle flap 11.

A catalytic converter 12 is accommodated in the exhaust-gas pipe 8 and cleans the exhaust gases arising from the combustion of the fuel. The catalytic converter 12 is a nitrogen oxide NOx storage catalytic converter 12', which is coupled to a 3-directional catalytic converter 12" as an oxygen store.

Input signals 19 are applied to a control apparatus 18 and define operating quantities of the engine 1 which are measured by means of sensors. The control apparatus 18 generates output signals 20 which can influence the performance of the engine 1 via actuators or positioning devices. The control apparatus 18 is, inter alia, provided for controlling (open loop and/or closed loop) operating variables of the engine 1. For this purpose, the control apparatus 18 is provided with a microprocessor which has a program stored in a storage medium, especially, in a flash memory. The program is suitable to carry out the above-mentioned control (open loop and/or closed loop).

In a first operating mode, a so-called homogeneous operation of the engine 1, the throttle flap 11 is partially opened or closed in dependence upon the desired torque. The fuel is injected into the combustion chamber 4 during an induction phase caused by the piston 2. The injected fuel is swirled by the air inducted simultaneously via the throttle flap 11 and is essentially uniformly distributed in the combustion chamber 4. Thereafter, the air/fuel mixture is compressed during the compression phase in order to be ignited by the spark plug 10. The piston 2 is driven by the expansion of the ignited fuel. In homogeneous operation, the arising torque is dependent, inter alia, on the position of the throttle flap 11. The air/fuel mixture is adjusted as close to lambda=1 as possible with a view to a low development of toxic substances.

In a second mode of operation, a so-called stratified operation of the engine 1, the throttle flap 11 is opened wide. The fuel is injected into the combustion chamber 4 by the injection valve 9 during a compression phase caused by the piston 2 and the fuel is injected locally in the direct vicinity of the spark plug 10 as well as at a suitable distance in time ahead of the ignition time point. The fuel is then ignited with the aid of the spark plug 10 so that the piston 2 is driven in the following work phase by the expansion of the ignited fuel. In stratified operation, the arising torque is dependent substantially on the injected fuel mass. The stratified operation is essentially provided for the idle operation and the part-load operation of the engine 1. Lambda is usually >1 in stratified operation.

During the stratified operation, the storage catalytic converter 12' is loaded with nitrogen oxides and the 3-way catalytic converter 12" is loaded with oxygen (storing phase) In a regeneration phase, the storage catalytic converter 12' and the 3-way catalytic converter 12" are again discharged so that they can again take up nitrogen oxides and oxygen, respectively, in the next stratified operation (discharge phase). A reduction agent is added to the exhaust gas ahead of the catalytic converter 12 during the regeneration phase. Hydrocarbons (HC), carbon monoxide (CO) or urea are examples of reducing agents which can be used. Hydrocarbons and carbon monoxide are generated in the exhaust gas via a rich mixture adjustment (operation of the internal combustion engine in homogeneous operation). Urea can be controllably metered to the exhaust gas from a supply vessel. The following processes take place during the regeneration phase of the catalytic converter 12: the reducing agent reduces the stored nitrogen oxides to nitrogen and oxygen. These substances leave the catalytic converter 12 so that an oxygen excess results behind the catalytic converter 12 during the regeneration phase even though the engine 1 is driven with a rich air/fuel mixture (oxygen deficiency).

An oxygen (O2) sensor 13 is mounted ahead of the catalytic converter 12 and a nitrogen oxide (NOx) sensor 14 is mounted in the exhaust-gas pipe 8 after the catalytic converter 12. After a switchover to oxygen deficiency (operation of the engine 1 with a rich mixture) forward of the catalytic converter 12 at the start of the regeneration phase, the O2 sensor 13 reacts virtually without delay. The oxygen storage locations of the catalytic converter 12 are at first almost all occupied because of the oxygen excess in the exhaust gas which is present during the stratified operation. After the switchover to oxygen deficiency at the start of the regeneration phase, the oxygen storage locations are successively liberated of oxygen which then exits from the catalytic converter 12. Accordingly, behind the catalytic converter 12, there is at first a further oxygen excess after the switchover into the regeneration phase. After a time span, which depends upon the oxygen storage capability of the catalytic converter 12, the total nitrogen oxide, which is stored in the storage catalytic converter 12', is reduced and the total oxygen, which is stored in the oxygen store 12", is removed so that an oxygen deficiency occurs also rearward of the catalytic converter 12 which effects a change of the output signal of the rearward O2 sensor 14".

Figure 2:
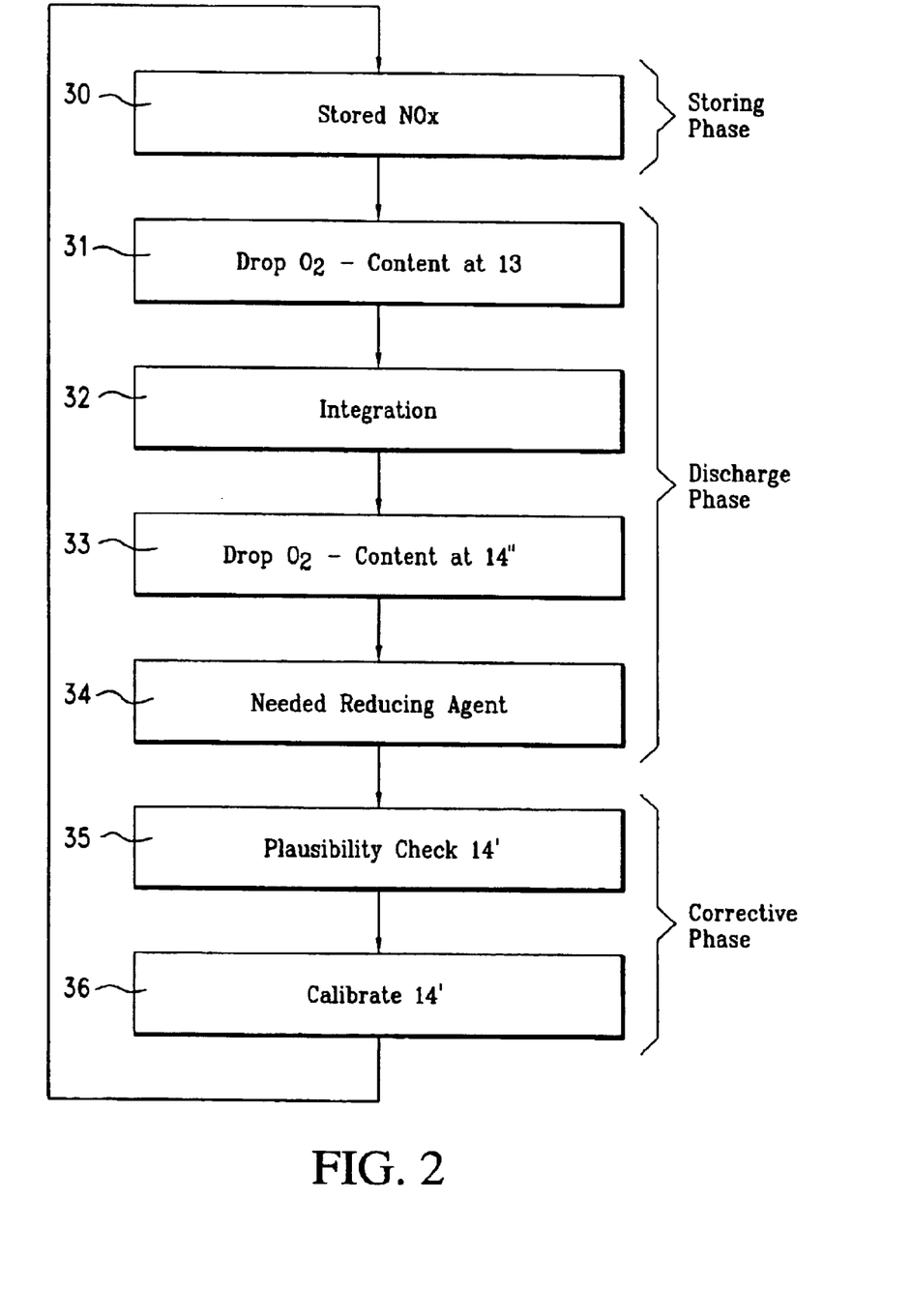
FIG. 2 is a sequence diagram of the method according to the invention.

A sequence diagram of the method of the invention is shown in FIG. 2. The diagram starts with a function block 30 wherein nitrogen oxides are stored in the catalytic converter 12 (storing phase) during a lean operation of the engine 1. The quantity of the nitrogen oxide, which is stored in the catalytic converter 12 during the first operating phase, is determined with the aid of an NOx storing model. In some circumstances, an adaptation of the NOx storing model takes place via the NOx sensor 14'.

The storage capability of the catalytic converter 12 is limited with respect to nitrogen oxides and oxygen. For this reason, the catalytic converter 12 must be regenerated from time to time. During the regeneration phase, the nitrogen oxides, which are stored in the catalytic converter 12, and the stored oxygen are discharged with the aid of reducing agents (discharge phase). During the regeneration phase, the engine 1 is driven with a rich air/fuel mixture. The drop of the oxygen content of the exhaust gas forward of the catalytic converter 12 from a lean to a rich air/fuel mixture is detected in function block 31 by the O2 sensor 13 virtually without delay.

Figure 3:
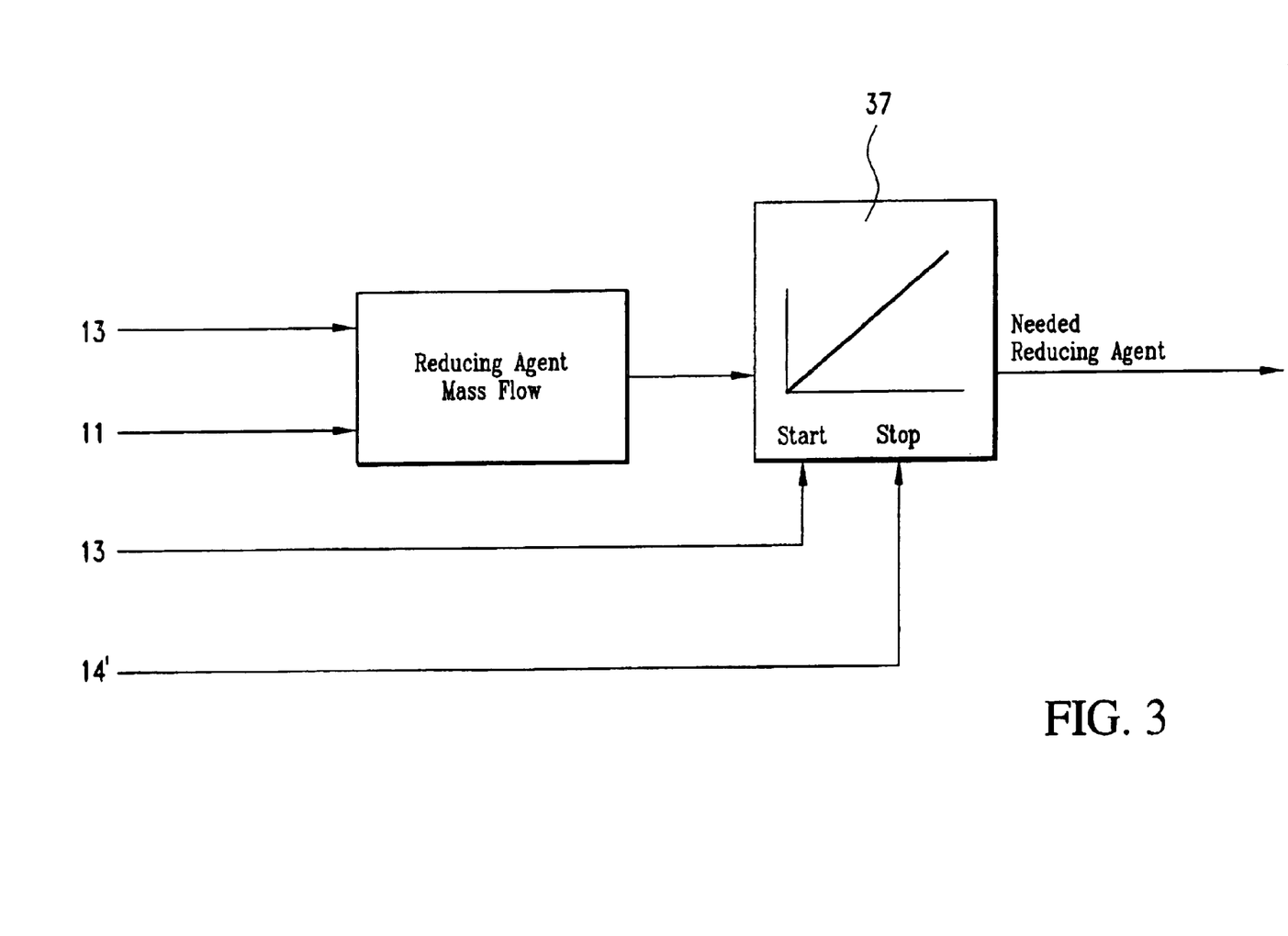
FIG. 3 is a schematic block circuit diagram of the second means of a control apparatus according to the invention.

When the O2 sensor 13 jumps from lean to rich, an integrator 37 (see FIG. 3) is started which integrates a reducing agent flow as a function of time. The integration of the reducing agent flow as a function of time takes place in function block 32. The reducing agent flow is determined from an air mass flow in the intake manifold 7 and from the oxygen content of the exhaust gas forward of the catalytic converter 12. The air mass flow in the intake manifold 7 can be determined by means of an air mass flow sensor (not shown) or by means for detecting the position of the throttle flap 11. The oxygen content of the exhaust gas ahead of the catalytic converter 12 is determined by the O2 sensor 13.

The reducing agent flow is integrated so long until, in function block 33, the rearward O2 sensor 14" detects a drop of the oxygen content of the exhaust gas downstream of the catalytic converter 12 from a lean to a rich air/fuel mixture. This is an indication that the nitrogen oxides in the catalytic converter 12 are virtually completely regenerated. When the O2 sensor 14" jumps from lean to rich, the integration (function block 32) is ended. With the integration of the reducing agent flow, the quantity of reducing agent is determined which is necessary for the regeneration of the catalytic converter 12 during the discharge phase (function block 34).

The quantity of reducing agent, which is needed in the context of the discharge phase, corresponds ideally to the nitrogen oxide store content of the previous storing phase which was determined by the NOx storing model. The NOx store content is determined by means of the NOx storing model and is controlled by the NOx sensor 14'. This NOx storage content is checked in function block 35 as to plausibility. For this purpose, the value of the quantity of stored nitrogen oxide is compared to the value of the quantity of needed reducing agent determined by integration. A deviation of the NOx store content from the independently determined quantity of reducing agent is applied in a function block 36 to calibrate the output signal of the NOx sensor 14'. Here, the slope of the NOx sensor 14' is checked and, if required, varied.

After function block 36, the method of the invention begins again at function block 30 where the internal combustion engine 1 is operated in lean operation. The method can be subdivided into various phases, namely, into the storing phase (function block 30), the discharge phase (function blocks 31 to 34) and a corrective phase with plausibility check (function block 35) and calibration of the NOx sensor 14' (function block 36). The various operating phases of the internal combustion engine 1 are run through cyclically one after the other. The corrective phase takes only a very short time relative to the storing phase and the discharge phase.

What is claimed is:

1. A method for operating a nitrogen oxide (NOx)-storage catalytic converter of an internal combustion engine including an internal combustion engine of a motor vehicle, the method comprising the steps of:

storing nitrogen oxides in said (NOx)-storage catalytic converter during a first operating phase thereof;

during said first operating phase, determining the amount of nitrogen oxides stored in said (NOx)-storage catalytic converter;

discharging the stored nitrogen oxides from said (NOx)-storage catalytic converter during a second operating phase thereof;

during said second operating phase, determining a quantity characterizing the amount of nitrogen oxides discharged from said (NOx)-storage catalytic converter;

comparing said quantity to the stored amount determined in said first operating phase; and, calibrating an exhaust-gas sensor mounted downstream of said (NOx)-storage catalytic converter utilizing said quantity determined in said second operating phase.

2. The method of claim 1, comprising the further step of determining said amount of nitrogen oxides stored during said first operating phase utilizing said exhaust-gas sensor.

3. The method of claim 2 said exhaust-gas sensor having a characteristic line, and said method comprising the further step of varying the slope of said characteristic line to calibrate the exhaust-gas sensor.

4. A method for operating a nitrogen oxide (NOx)-storage catalytic converter of an internal combustion engine including an internal combustion engine of a motor vehicle, the method comprising the steps of:

storing nitrogen oxides in said (NOx)-storage catalytic converter during a first operating phase thereof;

during said first operating phase, determining the amount of nitrogen oxides stored in said (NOx)-storage catalytic converter;

discharging the stored nitrogen oxides from said (NOx)-storage catalytic converter during a second operating phase thereof;

during said second operating phase, determining a quantity characterizing the amount of nitrogen oxides discharged from said (NOx)-storage catalytic converter;

comparing said quantity to the stored amount determined in said first operating phase; and, calibrating an exhaust-gas sensor mounted downstream of said (NOx)-storage catalytic converter utilizing paid quantity determined in said second operating phase, wherein the nitrogen oxides are discharged from said (NOx)-storage catalytic converter with the aid of a reducing agent and the amount of reducing agent, which is needed during the second operating phase, is determined as said quantity characterizing the discharged quantity of nitrogen oxides.

5. The method of claim 4, wherein the amount of reducing agent, which is needed during the second operating phase, is determined by an integration of the reducing agent flow over time.

6. The method of claim 5, wherein the reducing agent flow is determined from an air mass flow in an intake manifold of the internal combustion engine and from an oxygen content of the exhaust gas ahead of the storage catalytic converter.

7. The method of claim 5, wherein the integration is started with the drop of the oxygen content of the exhaust gas ahead of said (NOx)-storage catalytic converter from a lean to a rich air/fuel mixture.

8. The method of claim 7, wherein the integration is ended with the drop of the oxygen content of the exhaust gas downstream of said (NOx)-storage catalytic converter from a lean to a rich air/fuel mixture.

9. A control element, including a read-only-memory or a flash memory, for a control apparatus of an internal combustion engine including an internal combustion engine of a motor vehicle, the control element comprising a program stored thereon which is adapted to run on a computing apparatus including a microprocessor, and said program being suitable for carrying out a method for operating a nitrogen oxide (NOx)-storage catalytic converter of an internal combustion engine including an internal combustion engine of a motor vehicle, the engine generating nitrogen oxides (NOx) and the method comprising the steps of:

storing nitrogen oxides in said (NOx)-storage catalytic converter during a first operating phase thereof;

during said first operating phase, determining the amount of nitrogen oxides stored in said (NOx)-storage catalytic converter;

discharging the stored nitrogen oxides from said (NOx)-storage catalytic converter during a second operating phase thereof;

during said second operating phase, determining a quantity characterizing the amount of nitrogen oxides discharged from said (NOx)-storage catalytic converter;

comparing said quantity to the stored amount determined in said first operating phase; and, calibrating an exhaust-gas sensor mounted downstream of said (NOx)-storage catalytic converter utilizing said quantity determined in said second operating phase.

10. A control apparatus for an internal combustion engine including an internal combustion engine of a motor vehicle, said engine including an (NOx)-storage catalytic converter wherein nitrogen oxides are stored during a first operating phase and stored nitrogen oxides are discharged during a second operating phase, the control apparatus comprising:

first means for determining the amount of nitrogen oxides stored during the first operating phase;

second means for determining a quantity characterizing the amount of nitrogen oxides discharged during the second operating phase;

third means for comparing the amount of stored nitrogen oxides determined during the first operating phase to the determined quantity characterizing the amount of nitrogen oxides discharged during said second operating phase; and, fourth means for calibrating an exhaust-gas sensor mounted downstream of said (NOx)-storage catalytic converter utilizing said quantity determined in said second operating phase.

11. An internal combustion engine including an internal combustion engine of a motor vehicle, the internal combustion engine comprising:

an (NOx)-storage catalytic converter wherein nitrogen oxides are stored during a first operating phase and stored nitrogen oxides are discharged during a second operating phase;

a control apparatus including:

first means for determining the amount of nitrogen oxides stored during the first operating phase;

second means for determining a quantity characterizing the amount of nitrogen oxides discharged during the second operating phase;

third means for comparing the amount of stored nitrogen oxides determined during the first operating phase to the determined quantity characterizing the amount of nitrogen oxides discharged during said second operating phase; and, said internal combustion engine further including means for calibrating an exhaust-gas sensor mounted downstream of said (NOx)-storage catalytic converter utilizing said quantity determined in said second operating phase.

12. The internal combustion engine of claim 11, wherein said first means includes said exhaust-gas sensor.

13. The internal combustion engine of claim 12, wherein said exhaust-gas sensor is configured as a nitrogen oxide (NOx) sensor.

14. An internal combustion engine including an internal combustion engine of a motor vehicle, the internal combustion engine comprising:

an (NOx)-storage catalytic converter wherein nitrogen oxides are stored during a first operating phase and stored nitrogen oxides are discharged during a second operating phase;

a control apparatus including;

first means for determining the amount of nitrogen oxides stored during the first operating phase;

second means for determining a quantity characterizing the amount of nitrogen oxides discharged during the second operating phase;

third means for comparing the amount of stored nitrogen oxides determined during the first operating phase to the determined quantity characterizing the amount of nitrogen oxides discharged during said second operating phase; and, said internal combustion engine further including means for calibrating an exhaust-gas sensor mounted downstream of said (NOx)-storage catalytic converter utilizing said quantity determined in said second operating phase, wherein said second means includes an integrator for determining a quantity of reducing agent, which is needed during the second operating phase, by integrating a reducing agent flow over time.

15. The internal combustion engine of claim 14, further including an air mass sensor or means for detecting the position of a throttle flap mounted in the intake manifold for determining an air mass flow; an oxygen sensor mounted forward of the storage catalytic converter for detecting the oxygen content of the exhaust gas; and, means for detecting the reducing agent flow from the air mass flow and from the oxygen content of the exhaust gas.

16. The internal combustion engine of claim 15, wherein a drop of the oxygen content of the exhaust gas ahead of the storage catalytic converter from a lean to a rich air/fuel mixture initiates the integration.

17. The internal combustion engine of claim 16, wherein a drop of the oxygen content of the exhaust gas downstream of the storage catalytic converter from a lean to a rich air/fuel mixture ends the integration.

18. A control element, including a road-only-memory or a flash memory, for a control apparatus of an internal combustion engine including an internal combustion engine of a motor vehicle, the control element comprising a program stored thereon which is adapted to run on a computing apparatus including a microprocessor, and said program being suitable for carrying out a method for operating a nitrogen oxide (NOx)-storage catalytic converter of an internal combustion engine including an internal combustion engine of a motor vehicle, the engine generating nitrogen oxides (NOx) and the method comprising the steps of:

storing nitrogen oxides in said (NOx)-storage catalytic converter during a first operating phase thereof;

during said first operating phase, determining the amount of nitrogen oxides stored in said (NOx)-storage catalytic converter;

discharging the stored nitrogen oxides from said (NOx)-storage catalytic converter during a second operating phase thereof;

during said second operating phase determining a quantity characterizing the amount of nitrogen oxide discharged from said (NOx)-storage catalytic converter;

comparing said quantity to the stored amount determined in said first operating phase; and, calibrating an exhaust-gas sensor mounted downstream of said (NOx)-storage catalytic converter utilizing said quantity determined in said second operating phase, wherein the nitrogen oxides are discharged from said (NOx)-storage catalytic converter with the aid of a reducing agent and the amount of reducing agent, which is needed during the second operating phase, is determined as said quantity characterizing the discharged quantity of nitrogen oxides.

19. A control apparatus for an internal combustion engine including an internal combustion engine of a motor vehicle, said engine including an (NOx)-storage catalytic converter wherein nitrogen oxides are stored during a first operating phase and stored nitrogen oxides are discharged during a second operating phase, the control apparatus comprising:

first means for determining the amount of nitrogen oxides stored during the first operating phase;

second means for determining a quantity characterizing the amount of nitrogen oxides discharged during the second operating phase, said nitrogen oxides being discharged with the aid of a reducing agent;

third means for determining the amount of reducing agent;

fourth means for comparing the amount of stored nitrogen oxides determined during the first operating phase to the determined quantity characterizing the amount of nitrogen oxides discharged during said second operating phase; and, fifth means for calibrating an exhaust-gas sensor mounted downstream of said (NOx)-storage catalytic converter utilizing said quantity determined in said second operating phase.

* * * * *

UNITED STATES PATENT AND TRADEMARK OFFICE
CERTIFICATE OF CORRECTION

PATENT NO. : 6,901,745 B2
DATED : June 7, 2005
INVENTOR(S) : Eberhard Schnaibel and Klaus Winkler It is certified that error appears in the above-identified patent and that said Letters Patent is hereby corrected as shown below:

Column 8,
Line 52, delete "claim 2" and substitute -- claim 2, -- therefor.

Column 9,
Line 7, delete "paid" and substitute -- said -- therefor.

Column 10,
Line 50, delete "including;" and substitute -- including: -- therefor.

Column 11,
Line 19, delete "road-" and substitute -- read- -- therefor.
Line 38, delete "phase" and substitute -- phase, -- therefor.
Line 39, delete "oxide" and substitute -- oxides -- therefor.

Signed and Sealed this

Sixteenth Day of August, 2005

JON W. DUDAS
*Director of the United States Patent and Trademark Office*